US012787129B2

(12) United States Patent
Aizawa

(10) Patent No.: US 12,787,129 B2
(45) Date of Patent: Nov. 3, 2026

(54) DIELECTRIC HEATING DEVICE AND LIQUID EJECTION SYSTEM

(71) Applicant: SEIKO EPSON CORPORATION, Tokyo (JP)

(72) Inventor: Tadashi Aizawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 607 days.

(21) Appl. No.: 18/456,805

(22) Filed: Aug. 28, 2023

(65) Prior Publication Data

US 2024/0074009 A1 Feb. 29, 2024

(30) Foreign Application Priority Data

Aug. 29, 2022 (JP) ................................ 2022-135640

(51) Int. Cl.
*H05B 6/54* (2006.01)
*H05B 6/62* (2006.01)

(52) U.S. Cl.
CPC ................. *H05B 6/54* (2013.01); *H05B 6/62* (2013.01)

(58) Field of Classification Search
CPC ... H05B 6/46; H05B 6/54; H05B 6/62; H05B 6/60
See application file for complete search history.

(56) References Cited

U.S. PATENT DOCUMENTS 2,732,471 A * 1/1956 Sweets ..................... H05B 6/62 333/24 R
2,783,348 A * 2/1957 Warren .................... H05B 6/62 333/229
2003/0199251 A1* 10/2003 Gorbold .................. H05B 6/54 455/66.1
2020/0084844 A1* 3/2020 Qiu ....................... H05B 6/688

FOREIGN PATENT DOCUMENTS

JP 2017-016742 A 1/2017

* cited by examiner

*Primary Examiner* — Phutthiwat Wongwian
*Assistant Examiner* — Jacek Lisowski
(74) *Attorney, Agent, or Firm* — Harness, Dickey & Pierce, P.L.C.

(57) ABSTRACT

A dielectric heating device includes a transport section that transports a medium; an electrode unit that has a first electrode and a second electrode facing the medium in a first direction and to which an AC voltage is applied, and that heats the medium by a dielectric heating; and a control section which controls the transport section, wherein the second electrode is located to surround the first electrode as viewed along the first direction, the first electrode includes a first conductor and a second conductor protruding from the first conductor toward the medium, and the second conductor is covered by the first conductor when projected onto a plane perpendicular to the first direction.

11 Claims, 12 Drawing Sheets

DIELECTRIC HEATING DEVICE AND LIQUID EJECTION SYSTEM

The present application is based on, and claims priority from JP Application Serial Number 2022-135640, filed Aug. 29, 2022, the disclosure of which is hereby incorporated by reference herein in its entirety.

BACKGROUND

1. Technical Field

The present disclosure relates to a dielectric heating device and a liquid ejection system.

2. Related Art

JP-A-2017-16742 discloses a dielectric heating device with a planar shaped first electrode having a circular hole and a cylindrical shaped second electrode having an end portion located within the region of the circular hole as viewed from a direction perpendicular to the first electrode. JP-A-2017-16742 describes that objects to be heated can be heated evenly by generating an electric field radially from the second electrode to the first electrode.

However, in the device described in JP-A-2017-16742, just below the second electrode, a portion where the electric field intensity is locally very weak could occur, resulting in uneven heating. Therefore, there is room for further improvement in heating objects evenly.

SUMMARY

According to a first aspect of this disclosure, a dielectric heating device is provided. This dielectric heating device includes a transport section that transports a medium; an electrode unit having a first electrode and a second electrode that face the medium in a first direction and to which an AC voltage is applied, and heating the medium by a dielectric heating; and a control section that controls the transport section, wherein: the second electrode is located so as to surround the first electrode as viewed along the first direction, the first electrode has a first conductor and a second conductor that protrudes from the first conductor toward the medium, and the second conductor is covered by the first conductor when projected onto a plane perpendicular to the first direction.

According to a second aspect of this disclosure, a liquid ejection system is provided. This liquid ejection system includes the dielectric heating device in the above aspect and a liquid ejection section that applies liquid to the medium.

DESCRIPTION OF EMBODIMENTS

A. First Embodiment

Figure 1:
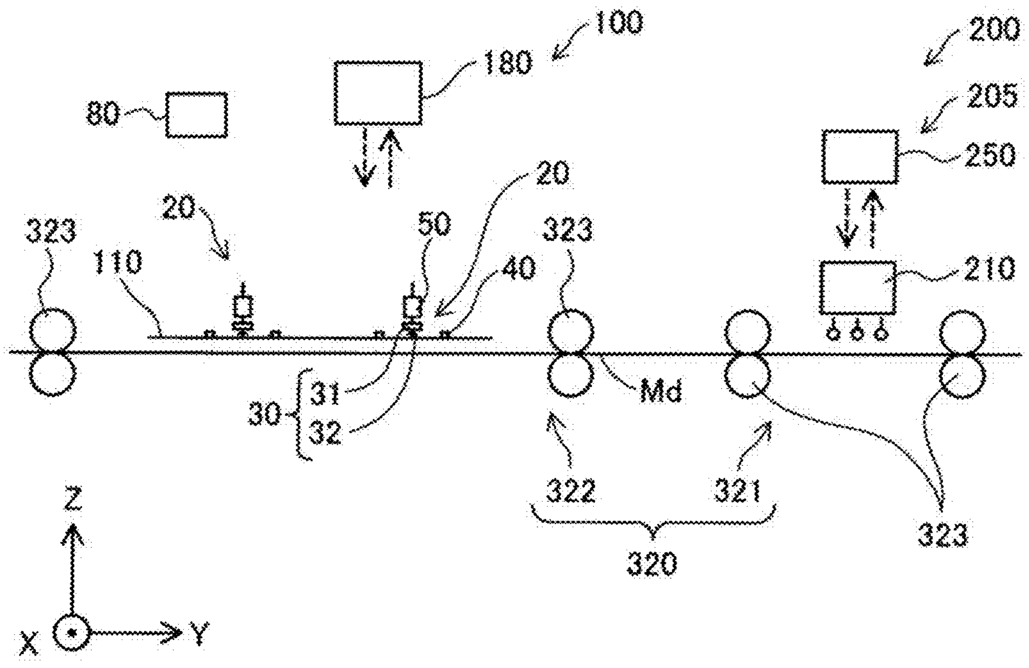
FIG. 1 is a schematic diagram showing schematic configuration of a liquid ejection system as a first embodiment.

FIG. 1 is a schematic diagram showing general configuration of a liquid ejection system 200 as a first embodiment. In FIG. 1, arrows are shown indicating an X direction, a Y direction, and a Z direction, which are orthogonal to each other. The X direction and the Y direction are directions parallel to the horizontal plane, and the Z direction is a direction along a vertically upward direction. The arrows indicating the X, Y, and Z directions are shown in other figures as well, so that the shown directions correspond to those in FIG. 1. In the following description, when specifying a directional orientation, a direction indicated by the arrow in each figure is "+" and the opposite direction is "−". These positive and negative signs are used together in the directional orientation. Hereinafter, the +Z direction is also referred to as "upward" and the −Z direction is also referred to as "downward". Also, the term "orthogonal" herein includes a range of 90°±10°. A plane along the X direction and the Y direction is also referred to as an "XY plane".

The liquid ejection system 200 is equipped with a dielectric heating device 100 having the electrode unit 20, a liquid ejection device 205, and a transport section 320. The liquid ejection system 200 in this embodiment ejects and applies liquid to a medium Md by the liquid ejection device 205 while transporting the medium Md by the transport section 320, and heats and dries the liquid applied to the medium Md by the electrode unit 20 of the dielectric heating device 100. In other words, the liquid ejection device 205 can also be said to apply the liquid, which is to be heated by the electrode unit 20, onto the medium Md. The electrode unit 20 is also referred to as a heater.

For example, paper, cloth, film, or the like, is used as the medium Md. The cloth used as the medium Md is made, for example, by weaving fibers such as cotton, hemp, polyester, silk, rayon, or blends of these fibers. In this embodiment, a sheet of cotton cloth is used as the medium Md. For example, various types of inks are used as liquids to be applied to the medium Md. In this embodiment, an aqueous ink in which water is the main ingredient is used as the liquid. In this specification, the main ingredient of liquid refers to a substance in the liquid of which the mass fraction is equal to or higher than 50%. In other embodiments, in addition to ink, any liquid other than ink may be used as the liquid, for example, various coloring materials, electrode materials, samples such as bioorganic or inorganic substances, lubricant, resin solution, etching solution, and the like.

The transport section 320 transports the medium Md. In this embodiment, the transport section 320 is configured as a roller mechanism that transports the medium Md by driving rollers 323. The transport section 320 has a first transport section 321 provided in the liquid ejection device 205 and a second transport section 322 provided in the dielectric heating device 100. The first transport section 321 and the second transport section 322 each have a roller 323 and a drive section (not shown) comprising a motor or the like to drive the roller 323. In other embodiments, the transport section 320 may be configured as a belt mechanism that transports the medium Md by driving a belt, for example.

The first transport section 321 is located in the +Y direction from the second transport section 322. In this embodiment, the first transport section 321 and the second transport section 322 intermittently transport the sheet-shaped medium Md in the −Y direction. More specifically, the first transport section 321 and the second transport section 322 alternately repeat a movement operation in which the rollers 323 are operated to transport the medium Md in the −Y direction and a stationary operation in which the medium Md is held stationary without operating the rollers 323.

In this embodiment, the liquid ejection device 205 is configured as an inkjet printer that prints by ejecting and applying ink as liquid onto the medium Md. Therefore, the liquid ejection system 200 can be said to be configured as a printing system equipped with the inkjet printer. The liquid ejection device 205 has a liquid ejection section 210 that ejects and applies liquid to the medium Md, a first control section 250, and the first transport section 321 described above.

The liquid ejection section 210 is configured as, for example, a piezoelectric type or thermal type liquid ejection head, and has one or more head chips (not shown). Each head chip has a flow path through which liquid flows and nozzles for ejecting the liquid. The colors of ink ejected from the head chips may be the same or different from each other. In addition, the liquid ejection section 210 may be configured to move reciprocally with respect to the medium Md in a direction orthogonal to the Z direction and intersecting the Y direction, for example, by a carriage (not shown), or it may be configured as a so-called line head whose position is fixed without moving reciprocally with respect to the medium Md.

The ink used as liquid in this embodiment is pigment ink containing resin. The resin in the ink works to firmly fix the pigment on the medium Md through the resin itself. Such resin is used, for example, in a form of fine particles of resin that is difficult to dissolve or insoluble in water or other solvents and in a state dispersed in the solvent, that is, in an emulsion state or a suspension state. For such resins, for example, acrylic resin, styrene acrylic resin, fluorene resin, urethane resin, polyolefin resin, rosin modified resin, terpene resin, polyester resin, polyamide resin, epoxy resin, vinyl chloride resin, vinyl chloride—vinyl acetate copolymer, ethylene vinyl acetate resin, and the like, can be used. Two or more of these resins may be used together. Such resins are also referred to as resin.

The first control section 250 is configured by a computer that is equipped with one or more processors, a storage device, and an input-output interface for inputting and outputting signals to and from the outside of the computer. The first control section 250 in this embodiment controls the liquid ejection section 210 and the first transport section 321 to eject and adhere liquid to the medium Md while intermittently transporting the medium Md in the −Y direction. More specifically, the first control section 250 performs printing on the medium Md while repeating ejection of liquid onto the medium Md during the stationary operation by the first transport section 321 described above and movement of the medium Md in the −Y direction by the movement operation by the first transport section 321. In other embodiments, the first control section 250 may be configured, for example, by a combination of multiple circuits. The first control section 250 is also referred to as an ejection control section.

Figure 2:
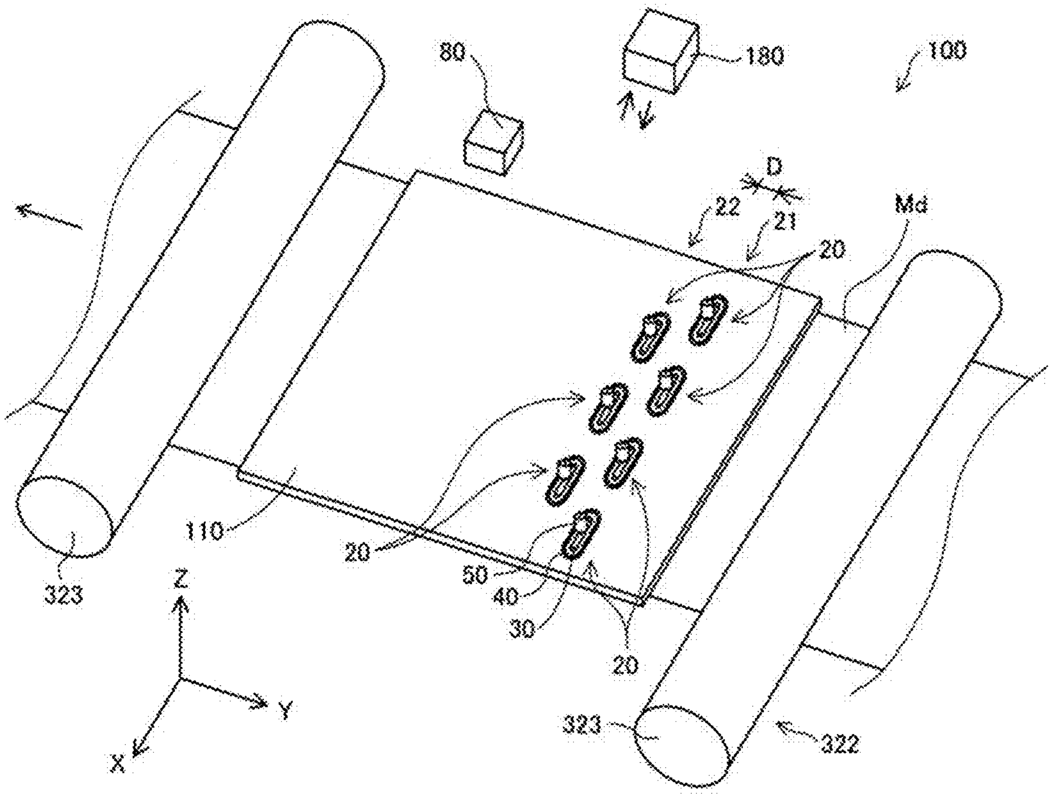
FIG. 2 is a perspective view showing schematic configuration of a dielectric heating device according to the first embodiment.

FIG. 2 is a perspective view showing schematic configuration of the dielectric heating device 100 according to the first embodiment. As shown in FIG. 1 and FIG. 2, the dielectric heating device 100 has electrode units 20 that heat medium Md by a dielectric heating method, a voltage applying section 80 that applies AC voltage to the electrode units 20, a second control section 180, and the second transport section 322. The dielectric heating device 100 in this embodiment dries medium Md by heating the medium Md by an AC electric field generated by the electrode units 20 while the medium Md is transported by the second transport section 322. When the term "heating medium Md by AC electric field" is used, it includes not only heating the medium Md itself by the AC electric field, but also heating adherent substances such as liquids or solids on the medium Md by the AC electric field.

The voltage applying section 80 is electrically connected to the first electrodes 30 and the second electrodes 40 of the electrode units 20 (to be described later), and applies an AC voltage with a predetermined drive frequency f0 to the first electrodes 30 and the second electrodes 40. In this embodiment, the voltage applying section 80 is configured as a high-frequency power supply including a high-frequency voltage generation circuit and, although not shown in the drawings, has a crystal oscillator, a phase locked loop (PLL) circuit, and a power amplifier. In other embodiments, the voltage applying section 80 may be configured as an inverter with a switching circuit having switching elements such as transistors, for example. One of the applied voltages to the first electrodes 30 and the second electrodes 40 may be a reference voltage. The reference voltage is a constant voltage that is a reference for the high-frequency voltage and is, for example, a ground voltage.

In this embodiment, a high-frequency voltage is applied to each electrode of the electrode units 20. In this specification, "high frequency" refers to frequencies equal to or higher than 1 MHz. More specifically, in this embodiment, 13.56 MHz, which is one of the Industrial Scientific and Medical Bands (ISM-band), is used as the drive frequency f0. Since the dielectric dissipation factor of water reaches its maximum at around 20 GHz, the liquid adhered to the medium Md can be heated more efficiently by applying a high-frequency voltage of 2.45 GHz or 5.8 GHz in the ISM band to each electrode in the electrode units 20. On the other hand, in terms of heating the ink, good heating efficiency can be obtained even when the drive frequency f0 is relatively low, such as 13.56 MHz or 40.68 MHz. The reason for this that when the drive frequency f0 is 13.56 MHz or 40.68 MHz, the dielectric dissipation factor of water in the ink is lower, but Joule heat being generated by the dye ingredients or the like in the ink as electrical resistance is more likely to occur.

The second control section 180 is configured by a computer, similar to the first control section 250 described above. The second control section 180 controls the second transport section 322 described above to transport the medium Md. In this embodiment, AC voltage is applied to the electrode units 20 and the medium Md is heated by the electrode units 20, even when the movement operation is being performed or when the stationary operation is being performed by the second transport section 322 described above. Hereinafter, the second control section 180 is also simply referred to as a control section.

As shown in FIG. 2, in this embodiment, the dielectric heating device 100 has seven electrode units 20. More specifically, in this embodiment, the dielectric heating device 100 has a first electrode unit row 21 and a second electrode unit row 22. The first electrode unit row 21 is composed of four electrode units 20 located side by side at equal intervals in the X direction. The second electrode unit row 22 is composed of three electrode units 20 located side by side at equal intervals in the X direction. The second electrode unit row 22 is located in the −Y direction of the first electrode unit row 21. The first electrode unit row 21 and the second electrode unit row 22 are located apart by a distance D in the Y direction. In this embodiment, the distance D is substantially the same as the distance that the medium Md is transported by one movement operation by the first transport section 321 described above, and also the same as the dimension of an electrode unit 20 in the Y direction. In other embodiments, for example, the number of the electrode units 20 may be six or less, or may be eight or more. The arrangement of each of the electrode units 20 may be in any desired manner.

Figure 3:
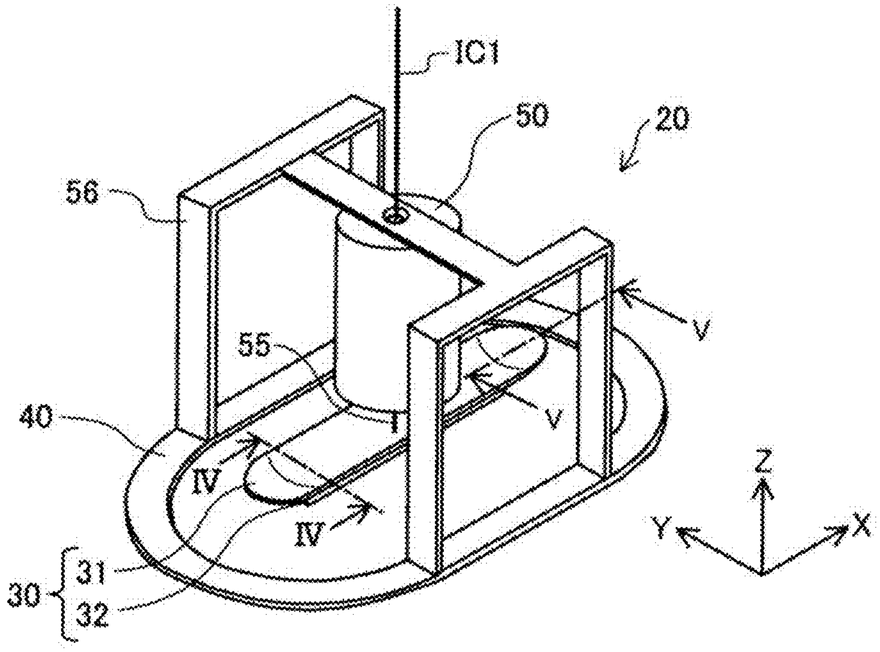
FIG. 3 is a perspective view showing a schematic configuration of an electrode unit according to the first embodiment.

FIG. 3 is a perspective view showing a schematic configuration of the electrode unit 20 in this embodiment. As shown in FIG. 1 to FIG. 3, the electrode unit 20 has a first electrode 30 and a second electrode 40. The electrode unit 20 in this embodiment has a coil 50.

The first electrode 30 and the second electrode 40 are conductors, for example, formed by metals, alloys, conductive oxides, or the like. The first electrode 30 and the second electrode 40 may be formed of the same material or of different materials. The first electrode 30 and the second electrode 40 may be located on a substrate or other material formed of a material with a low dielectric dissipation factor or conductivity, for example, to maintain their orientation and strength. They may also be supported by other members.

The first electrode 30 and the second electrode 40 face the medium Md in a first direction. The first direction includes both of one direction and the opposite direction along the same axis. In this embodiment, the first direction is the Z direction.

The first electrode 30 has a first conductor 31 and a second conductor 32. The second conductor 32 protrudes from the first conductor 31 toward the medium Md. When the second conductor 32 is projected onto the XY plane, the second conductor 32 is covered by the first conductor 31. The first conductor 31 and the second conductor 32 may be separated or integrated.

The first conductor 31 in this embodiment has an elongated shape with a longitudinal direction along a second direction and a shorter direction along a third direction. The second direction is a direction orthogonal to the first direction. The second direction includes both of one direction and the opposite direction along the same axis. In this embodiment, the second direction is the X direction. The third direction is a direction orthogonal to the first direction and the second direction. The third direction includes both of one direction and the opposite direction along the same axis. In this embodiment, the third direction is the Y direction.

In this embodiment, the first conductor 31 as a whole has a plate shape curved so that it has a convex curved surface shape in the −Z direction. As viewed along the Z direction, the first electrode 30 has an elongated shape with the X direction as the longitudinal direction and with the Y direction as the shorter direction. The first conductor 31 in this embodiment can also be said to have a boat shape extending along the X direction.

Figure 4:
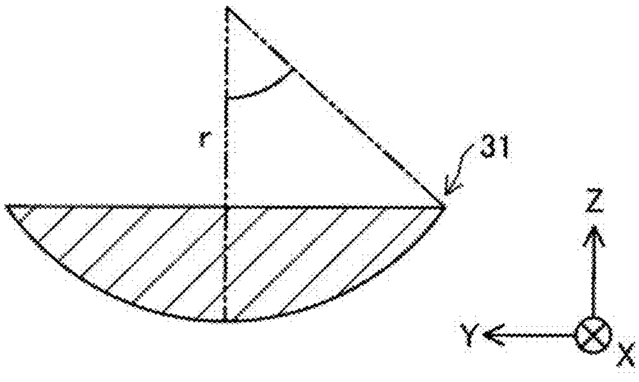
FIG. 4 is a view showing a IV-IV cross-section of a first conductor in FIG. 3.
Figure 5:
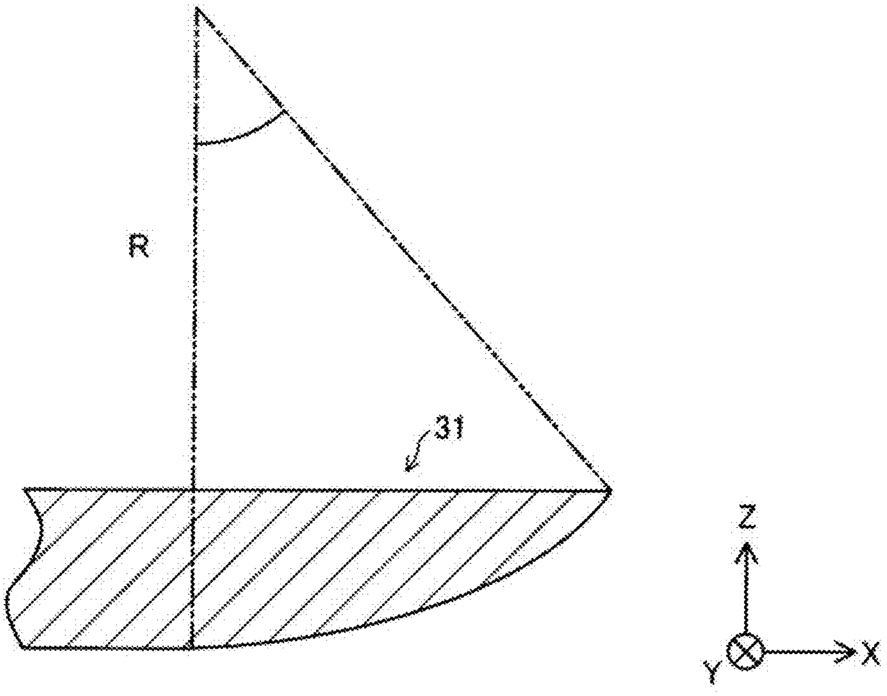
FIG. 5 is a view showing a V-V cross-section of the first conductor in FIG. 3.

FIG. 4 is a view showing a IV-IV cross section of the first conductor 31 in FIG. 3. FIG. 5 is a view showing a V-V cross section of the first conductor 31 in FIG. 3. As shown in FIG. 3 and FIG. 4, the first conductor 31 has an arc shape that is convex in the −Z direction as viewed along the X direction. Similarly, as shown in FIGS. 3 and 5, the first conductor 31 has an arc shape that is convex in the −Z direction as viewed along the Y direction.

As shown in FIG. 3 to FIG. 5, the first conductor 31 in this embodiment has as a whole a rounded shape, with few sharp corners. As a result, it is possible to suppress concentration of the electric field at specific portions such as end portions of the first conductor 31. In this embodiment, the first conductor 31 has the boat shape. Therefore, the distance in the Z direction between the medium Md and the end portions of the first conductor 31 in the longitudinal direction or the shorter direction is longer than the distance in the Z direction between the medium Md and the center portion of the first conductor 31 in the longitudinal direction and the shorter direction. As a result, it possible is possible to further suppress the concentration of the electric field at the end portions of the first electrode 30. A radius of curvature R shown in FIG. 5 of the X-direction end portion of the first conductor 31 is larger than the radius of curvature r shown in FIG. 4 of the Y-direction end portion of the first conductor 31. Thereby, it is possible to further suppress the concentration of the electric field, especially at the end portions in the longitudinal direction of the first conductor 31.

Figure 6:
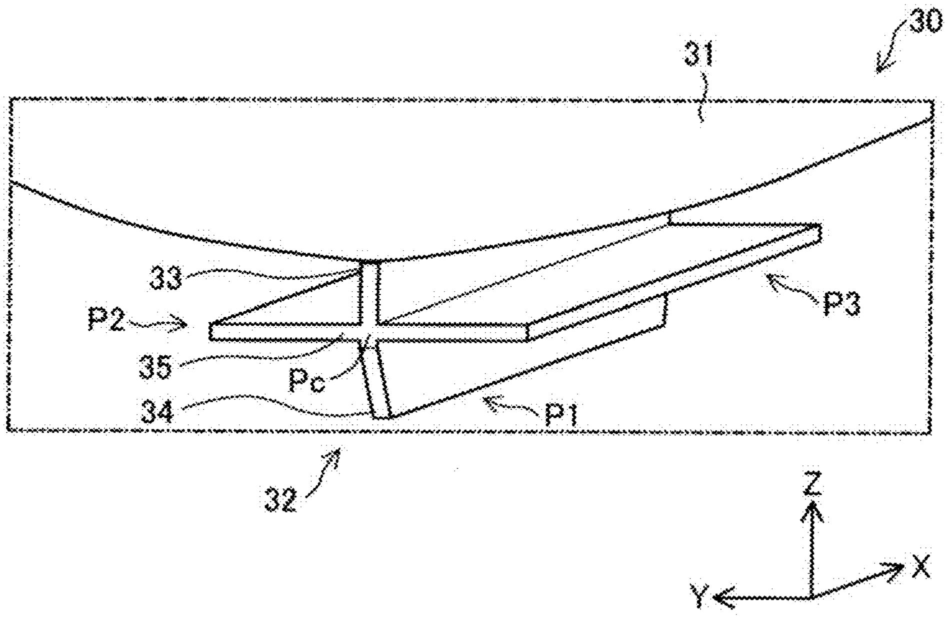
FIG. 6 is a perspective view showing a part of a first electrode in a first embodiment.
Figure 7:
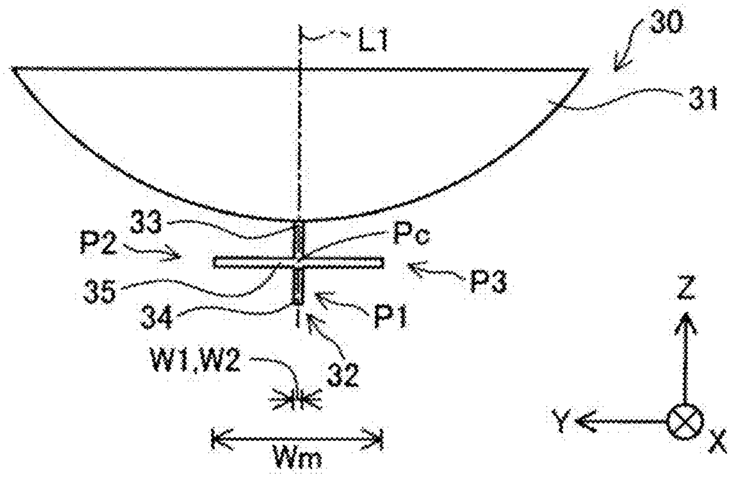
FIG. 7 is a first side view of the first electrode.
Figure 8:
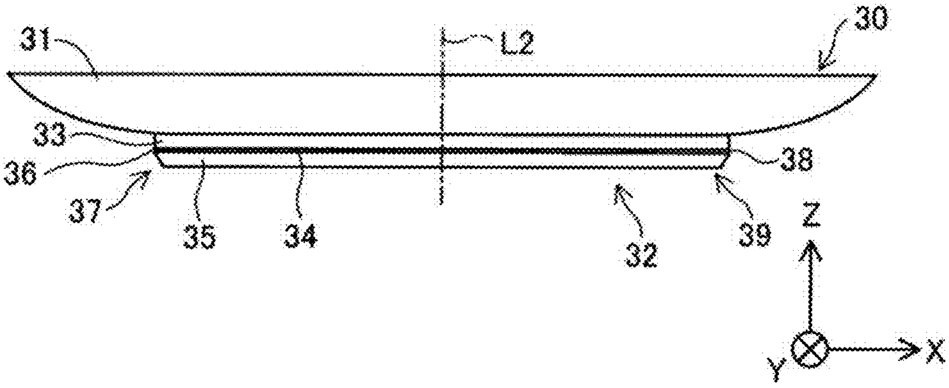
FIG. 8 is a second side view of the first electrode.

FIG. 6 is a perspective view showing a part of the first electrode 30. FIG. 7 is a first side view of the first electrode 30. FIG. 8 is a second side view of the first electrode 30. FIG. 7 shows the first electrode 30 viewed along the X direction. FIG. 8 shows a state where the first electrode 30 is viewed along the Y direction.

As shown in FIG. 6, in this embodiment, as viewed along the Z direction, the second conductor 32 has an elongated shape having a longitudinal direction along the X direction and a shorter direction along the Y direction. As shown in FIG. 7, in this embodiment, as viewed along the X direction, the second conductor 32 has a shape that is line symmetrical with respect to a line L1 passing through the center of the first conductor 31 in the Y direction. Therefore, as viewed along the X direction, the center position of the first conductor 31 in the Y direction coincides with the center position of the second conductor 32 in the Y direction. As shown in FIG. 8, as viewed along the Y direction, the second conductor 32 has a shape that is line symmetrical with respect to a line L2 passing through the center of the first conductor 31 in the X direction. Therefore, as viewed along the Y direction, the center position of the first conductor 31 in the X direction coincides the center position of the second conductor 32 in the X direction.

As shown in FIG. 6 to FIG. 8, in the Z direction, the second conductor 32 has a first end portion 33, which is connected to the first conductor 31, a second end portion 34, which is on the opposite side from the first end portion 33, and an intermediate portion 35, which is located between the first end portion 33 and the second end portion 34. In this embodiment, the second end portion 34, the intermediate portion 35, and the first end portion 33 are located in this order from the bottom. As shown in FIG. 7, the width Wm in the Y direction of the intermediate portion 35 is larger than the width W1 in the Y direction of the first end portion 33 and the width W2 in the Y direction of the second end portion 34. When the second conductor 32 is projected onto the XY plane, which is perpendicular to the Z direction, the first end portion 33 and the second end portion 34 are covered by the intermediate portion 35. In other words, when the second conductor 32 is projected onto the XY plane, all of the first end portion 33 and all of the second end portion 34 overlap the intermediate portion 35. In this embodiment, the width W1 and the width W2 are the same width.

As shown in FIG. 7, in this embodiment, the second conductor 32 has a cruciform shape as viewed along the X direction. More specifically, the second conductor 32 has a first portion P1, which is flat plate-shaped and extends along the X and Z directions, a second portion P2, which is rectangular plate-shaped and extends along the X and Y directions so that it protrudes in the +Y direction from the center portion Pc in the Z direction of the first portion P1, and a third portion P3, which is rectangular plate-shaped and extends along the X and Y directions so as to protrude in the −Y direction from the center portion Pc. The first portion P1 is located so that it extends downward from the center portion of the first conductor 31 in the Y direction as viewed along the X direction. The first end portion 33 described above is formed by an upper end portion of the first portion P1. The second end portion 34 is formed by a lower end portion of the first portion P1. The intermediate portion 35 is formed by the central portion Pc, the second portion P2, and the third portion P3.

As shown in FIG. 8, in this embodiment, one end portion 37 of the second conductor 32 in the X direction, which includes an edge portion 36, has a shape where the Z-direction distance between the medium Md and the second conductor gradually increases in the X direction that is from the opposite side from the edge portion 36 toward the edge portion 36. Similarly, in this embodiment, the other end portion 39 of the second conductor 32 in the X direction, which includes another edge portion 38, has a shape where the Z-direction distance between the medium Md and the second conductor gradually increases in the X direction that is from the opposite side from the other edge portion 38 toward the other edge portion 38. More specifically, the portion of the first portion P1 that is lower than the second portion P2 and the third portion P3 is formed into a substantially trapezoidal shaped plate that is convex below.

As shown in FIG. 3, the second electrode 40 is located so that it surrounds the first electrode 30 as viewed along the Z direction. The second electrode 40 in this embodiment has an oval annular shape flattened in the X and Y directions. Similar to the first electrode 30, the second electrode 40 has an elongated shape with the X direction as the longitudinal direction and the Y direction as the shorter direction as viewed along the Z direction. The first electrode 30 and the second electrode 40 are located so that the shortest distance between the first electrode 30 and the second electrode 40 is equal to or less than one-tenth of the wavelength of the electromagnetic field output from the electrode unit 20.

In other embodiments, the second electrode 40 may have, for example, a circular shape, a rectangular shape, or a polygonal annular shape. The term "located so that the second electrode 40 surrounds the first electrode 30 as viewed along the Z direction" means that the second electrode 40 is located so that the second electrode 40 as a whole surrounds more than half of the circumference of the first electrode 30 as viewed along the Z direction, and it is not a requirement that the second electrode 40 surrounds the entire circumference of the first electrode 30 without any gaps. Therefore, in other embodiments, the second electrode 40 may have a so-called C-shaped shape or U-shaped shape as viewed along the Z-direction, for example. For example, the second electrode 40 may have a shape that surrounds the first electrode 30 as a whole with intermittent breaks as viewed along the Z direction. In this case, the second electrode 40 is configured so that when the AC voltage is applied to the first electrode 30 and the second electrode 40, the same voltage is applied to each portion of the second electrodes 40.

As shown in FIG. 1 and FIG. 2, both the first electrodes 30 and the second electrodes 40 are located on a substrate 110 parallel to the X and Y directions. More specifically, the first electrode 30 is located such that the lower end portion of the first end portion 33 of the first conductor 31 contacts the upper surface of the substrate 110. The second electrode 40 is located so that the bottom surface of the second electrode 40 contacts the top surface of the substrate 110. Therefore, in this embodiment, the shortest distance in the Z direction between the first electrode 30 and the medium Md is equal to the shortest distance in the Z direction between the second electrode 40 and the medium Md. In other words, the lower end surface of the first end portion 33 and the bottom surface of the second electrode 40 can be said to be located on the same plane.

The substrate 110 suppresses adhesion of liquid such as ink applied to the medium Md to the first electrode 30 and the second electrode 40, and adhesion of fluff from the medium Md to the first electrode 30 and the second electrode 40 when the medium Md is cloth. In this embodiment, a single substrate 110 made of glass is shared by all the electrode units 20. In other embodiments, the substrate 110 may be formed, for example, by alumina. Further, the substrate 110 may be provided separately for each electrode unit 20, for example.

The description will return to FIG. 3. In this embodiment, the first electrodes 30 are electrically connected to the voltage applying section 80 via an electric wire 55, a coil 50, and an inner conductor IC1 of a coaxial cable. The second electrode 40 is electrically connected to the voltage applying section 80 via a connection member 56 located above the second electrode 40, an external conductor of a coaxial cable (not shown), or the like.

In this embodiment, one end portion of the coil 50 is electrically connected in series with the first electrode 30 through an electric wire 55, and the other end portion of the coil 50 is electrically connected in series with the voltage applying section 80 shown in FIG. 1 and FIG. 2. In this embodiment, the coil 50 is composed of a solenoid coil, and is located so that its length direction is along the Z direction. The shape, length, cross-sectional area, number of turns, and material of the coil 50 are selected, for example, according to the drive frequency f0 and to ensure impedance matching between the electrode unit 20 and the voltage applying section 80. In other embodiments, the one end portion of the coil 50 may be connected in series with the second electrode 40 instead of the first electrode 30.

When the AC voltage with the drive frequency f0 is applied to the first electrode 30 and the second electrode 40, an electromagnetic field with a wavelength corresponding to the drive frequency f0 is generated from the first electrode 30 and the second electrode 40. The intensity of this electromagnetic field is very strong near the first electrode 30 and the second electrode 40, and is very weak far from them. In this specification, the electromagnetic field generated near the first electrode 30 and the second electrode 40 by applying the AC voltage is also referred to as a "near-field electromagnetic field". The term "near" the first electrode 30 and the second electrode 40 refers to an area where the distance from the first electrode 30 and the second electrode 40 is equal to or less than ½π of the wavelength of the electromagnetic field to be generated. An area farther away than "near" is also referred to as "far". In this specification, the electromagnetic field generated far from the first electrode 30 and the second electrode 40 by applying the AC voltage is also referred to as a "far-field electromagnetic field". The far-field electromagnetic field corresponds to the electromagnetic field used for communication by a general communication antenna or the like.

As described above, the shortest distance between the first electrode 30 and the second electrode 40 is equal to or less than one-tenth of the wavelength of the electromagnetic field. By this, the density of the electromagnetic field generated from the first electrode 30 and the second electrode 40 can be attenuated near the first electrode 30 and the second electrode 40. In other words, by maintaining an appropriate distance between the medium Md and the first electrode 30 and the second electrode 40, the liquid adhering to the medium Md can be efficiently heated by the electric field generated near the first electrode 30 and the second electrode 40, while the radiation of far-field electromagnetic field from the first electrode 30 and the second electrode 40 is suppressed. In particular, in this embodiment, since the second electrode 40 is located so that it surrounds the first electrode 30 as viewed along the Z direction, the radiation of the far-field electromagnetic field from the first electrode 30 and the second electrode 40 can be further suppressed.

When the AC voltage is applied to the electrode unit 20, a high voltage is generated at one end of the coil 50. This can increase the intensity of the electric field generated from the first electrode 30 and the second electrode 40. It is desirable that the coil 50 is located so that the distance between the one end of the coil 50 and the first electrode 30 is as small as possible. If the distance between the one end of the coil 50 and the first electrode 30 is far, then, by the high voltage generated at one end of the coil 50, an electric field that does not contribute to heating the medium Md may be generated between the coil 50 and the first electrode 30 or between the electric wire 55 and the second electrode 40, and this electric field may decrease the effectiveness of increasing the intensity of the electric field from the first electrode 30 and the second electrode 40. In contrast, if the distance between the one end of the coil 50 and the first electrode 30 is made closer, the generation of such an electric field that does not contribute to heating the medium Md can be suppressed. Therefore, the electric field intensity generated from the first electrode 30 and the second electrode 40 can be effectively increased. In other embodiments, the electrode unit 20 may not have the coil 50. For example, by forming the first electrode 30 in a meander shape, the first electrode 30 may perform the same function as the coil 50.

Figure 9:
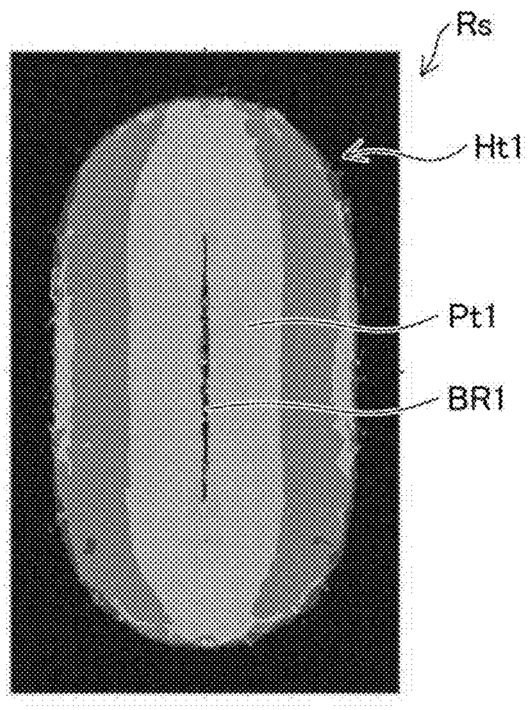
FIG. 9 is a first explanatory view showing distribution of heating energy in the first embodiment.

FIG. 9 is a first explanatory view showing distribution of heating energy in the first embodiment. FIG. 9 shows a simulation result of the heating of the medium Md by the electrode unit 20, using an electromagnetic field simulation. More specifically, FIG. 9 shows a simulation result of power consumption density in the region Rs when a sheet-shaped medium Md with ink uniformly applied to the upper surface is placed facing the first electrode 30 and the second electrode 40 of one electrode unit 20, and then a high-frequency voltage of 13. 56 MHz is applied to the first electrode 30 and the second electrode 40. The region Rs is a rectangular area that includes the portion of the medium Md top surface that overlaps the first electrode 30 and the second electrode 40 as viewed along the Z direction. In this simulation result, the distribution of the power consumption density in the region Rs is shown in 15 levels by different colors. For example, areas with the lowest power consumption density are represented by dark blue, and areas with the highest power consumption density is represented by red. In FIG. 9, higher power consumption density at a location means greater heating energy at that location.

Figure 10:
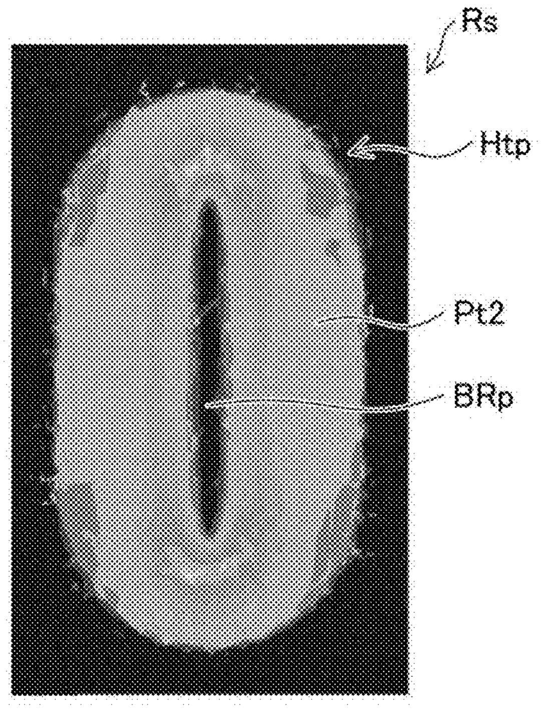
FIG. 10 is an explanatory view showing distribution of heating energy in another embodiment.
Figure 11:
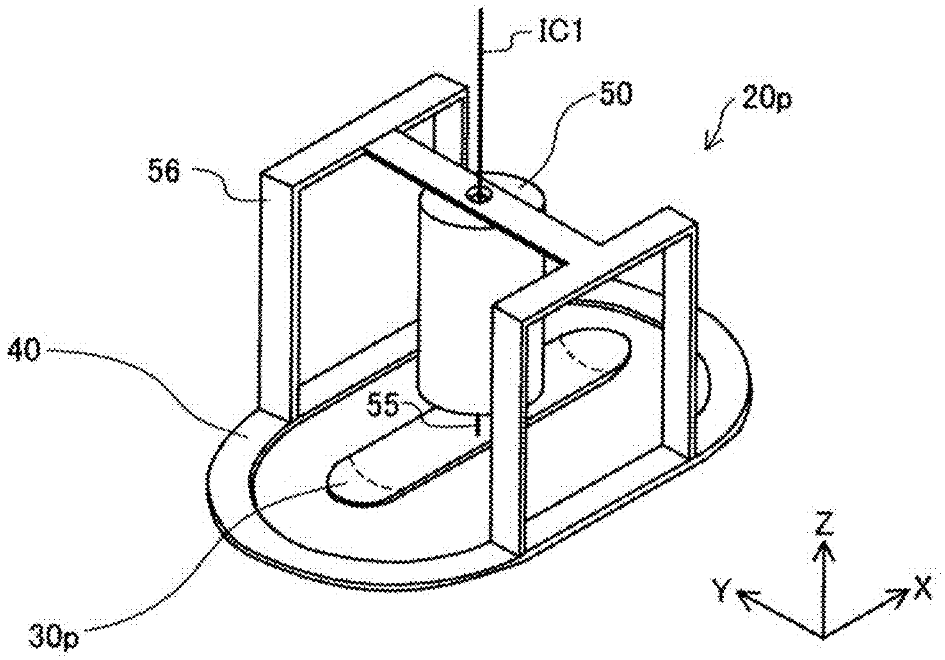
FIG. 11 is a perspective view of an electrode unit according to another embodiment.

FIG. 10 is an explanatory view showing distribution of heating energy in another embodiment. FIG. 11 is a perspective view of an electrode unit 20*p* in the other embodiment. FIG. 10 shows a simulation result of the heating of the medium Md by the electrode unit 20*p*, using the electromagnetic field simulation. The conditions for the simulation in FIG. 10 are the same as for the simulation in FIG. 9, except that the electrode unit 20*p* was used. The presentation of the simulation result of FIG. 10 is also the same as in the simulation in FIG. 9. As shown in FIG. 11, the configuration of the electrode unit 20*p* corresponds to a configuration in which the first electrode 30 of the electrode unit 20 is replaced by the electrode 30*p*. The electrode 30*p* is composed solely of a portion having a shape similar to that of the first conductor 31, and the bottom surface of its central portion is located on the same plane as the bottom surface of the second electrode 40 of the electrode unit 20*p*. Hereinafter, the electrode that is surrounded by the second electrode 40 as viewed in the Z direction, such as the first electrode 30 and the electrode 30*p*, is also referred to as an inner electrode. The center of the region Rs shown in FIG. 9 and FIG. 10 overlaps the center of the inner electrode in the X and Y directions.

In the simulation results in FIG. 9 and FIG. 10, respectively, a heat region Ht1 and a heat region Htp were observed within the region Rs, which extends in a substantially elliptical shape surrounding a blank region described later. The positions of the outer edges of the heat region Ht1 and the heat region Htp substantially coincide with the positions where the top surface of the medium Md overlaps the outer edge of the second electrode 40. The simulation results of FIG. 9 and FIG. 10 show that the power consumption density was in the fourth level for the majority of the heat region Ht1 and the heat region Htp. For example, point Pt1 shown in FIG. 9 and point Pt2 shown in FIG. 10 are locations where the power consumption density is at the fourth level.

In FIG. 9 and FIG. 10, blank region BR1 and blank region BRp occurred in the center of the regions Rs. The blank region is a region where the intensity of near-field electric field is very weak, which occurs locally within the region of the upper surface of the medium Md that overlaps the center electrode as viewed along the Z direction. Therefore, the medium Md is hardly heated in the blank region. In the simulation results of FIG. 9 and FIG. 10, the power consumption density in the blank region BR1 and the blank region BRp is at the first level. The power consumption density at the first level is equal to or less than one-third of the power consumption density at the fourth level described above. The blank region BR1 and the blank region BRp may include a portion where the power consumption densities are almost zero.

The area of the blank region BR1 shown in FIG. 9 was smaller than the area of the blank region BRp shown in FIG. 10. The reason for this is considered that in this embodiment, the electric field that contributes to the heating of the medium Md is formed between the second conductor 32 and the second electrode 40, thereby the portion where the intensity of the near-field electric field is very weak shrank.

Although the figure is omitted, if the inner electrode were formed only by portions having the same shape as the second conductor 32, the heating energy variation in the vicinity of the blank region would increase compared to the case where the inner electrode is formed by the first conductor 31 and the second conductor 32. In this embodiment, the width of the intermediate portion 35 of the second conductor 32 is wider than the widths of the first end portion 33 and the second end portion 34, which further suppresses variations in heating energy near the blank region BR1. In particular, in this embodiment, when projected onto the XY plane, the first end portion 33 and the second end portion 34 are covered by the intermediate portion 35, which can further suppress variations in the electric field intensity near the blank region BR1.

Unlike in this embodiment, when the electrode unit 20*p* shown in FIG. 11 is used to heat the medium Md, the amount of heating may be insufficient in the blank region BRp, resulting in uneven heating of the medium Md. In particular, when the medium Md is transported intermittently as in this embodiment, the amount of heating is likely to be insufficient at the portion of the medium Md that is located in the blank region BRp during the stationary operation. For example, when the movement speed of the medium Md with respect to the electrode unit 20*p* is relatively high, the heating amount in the portion of the medium Md that is located in the blank region BRp is likely to be insufficient. Therefore, when using the electrode unit 20*p* to heat the medium Md, it is necessary, for example, to position the electrode unit 20*p* so that it can compensate for the lack of the heating, to transport the medium Md with respect to the electrode unit 20*p* slowly enough, and to move the medium Md toward and away from the electrode unit 20*p* in small increments so that a portion of the medium Md that is located in the blank region BRp is not fixed. In contrast, the area of the blank region can be made smaller in this embodiment, which enables greater flexibility in the arrangement of the electrode units 20 and in the manner in which the medium Md is transported. More specifically, for example, the possibility of heating the medium Md evenly increases even when the movement speed of the medium Md with respect to the electrode unit 20 is relatively fast. Further, even when the medium Md is moved toward and away from the electrode unit 20 in small increments to compensate for the lack of heating as described above, the movement width can be made smaller.

According to the dielectric heating device 100 in the first embodiment described above, the first electrode 30 has the first conductor 31 and the second conductor 32, which protrudes from the first conductor 31 toward the medium Md. When the first electrode 30 is projected onto the XY plane, which is perpendicular to the Z direction, the second conductor 32 is covered by the first conductor 31. According to this aspect, the area of the blank region can be made smaller by the second conductor 32. That is, the second conductor 32 can suppress the occurrence of portions where the intensity of the near-field electric field is very weak locally within the region where the medium Md and the first electrode 30 overlap. Therefore, the possibility of heating the medium Md evenly is increased.

In this embodiment, the first conductor 31 and the second conductor 32 have an elongated shape with a longitudinal direction along the X direction and a shorter direction along the Y direction as viewed along the Z direction. Therefore, in the aspect where the first conductor 31 has an elongated shape, the area of the blank region can be effectively decreased by the second conductor 32, which has an elongated shape like the first conductor 31.

In this embodiment, the second conductor 32 has, in the Z direction, the first end portion 33 that is connected to the first conductor 31, the second end portion 34 that is on the opposite side from the first end portion 33, and an intermediate portion 35 that is located between the first end portion 33 and the second end portion 34 and that has the width, in the Y direction, greater than the widths of the first end portion 33 and the second end portion 34. In this way, the variation in the electric field intensity near the blank region can be more suppressed than, for example, in an aspect that does not have the intermediate portion 35 that is wider than widths of the first end portion 33 and the second end portion 34. Therefore, the possibility of heating the medium Md evenly is more likely.

In this embodiment, the first end portion 33 and the second end portion 34 are covered by the intermediate portion 35 when projected onto the XY plane. Therefore, the variation in the electric field intensity near the blank region can be further suppressed.

In this embodiment, the second conductor 32 has the cruciform shape as viewed along the X direction. Therefore, the area of the blank region can be decreased by a simple configuration, and the variation in the electric field intensity near the blank region can be suppressed.

In this embodiment, the one end portion 37 of the second conductor 32 in the X direction, including the one edge portion 36, has a shape where the distance in the Z direction between the second conductor 32 and the medium Md increases gradually in the X direction from the opposite side from the one edge portion 36 toward the one edge portion 36. Therefore, the concentration of the electric field at the one edge portion 36 can be suppressed.

In addition, in this embodiment, the radius of curvature R of the end portions of the first conductor 31 in the longitudinal direction is larger than the radius of curvature r of the end portions of the first conductor 31 in the shorter direction. Therefore, the concentration of electric field at the end portions in the longitudinal direction of the first conductor 31 can be suppressed.

In this embodiment, the shortest distance in the Z direction between the first electrode 30 and the medium Md is equal to the shortest distance in the Z direction between the second electrode 40 and the medium Md. Therefore, the possibility of heating the medium Md evenly is more likely. In addition, when heating a sheet-shaped medium Md as in this embodiment, it is easier to generate the electric field along the surface direction of the medium Md between the first electrode 30 and the second electrode 40, so the medium Md can be heated more efficiently.

B. Second Embodiment

Figure 12:
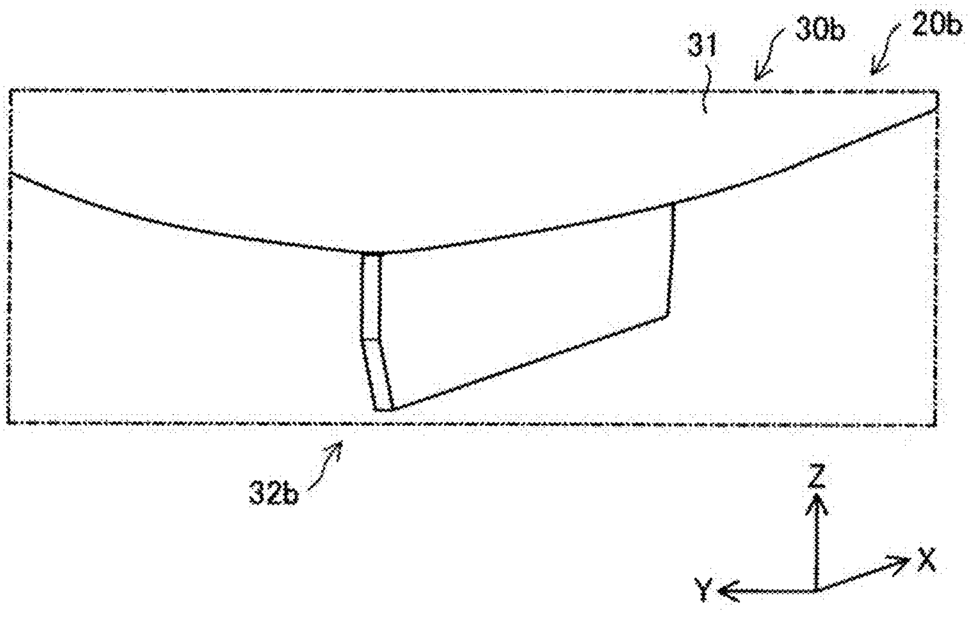
FIG. 12 is a perspective view showing a part of a first electrode of an electrode unit according to a second embodiment.

FIG. 12 is a perspective view showing a part of the first electrode 30*b* of the electrode unit 20*b* in the second embodiment. In this embodiment, unlike the first embodiment, the second conductor 32*b* of the first electrode 30*b* do not have the cruciform shape as viewed along the X direction. In the description of the configuration of the electrode unit 20*b* and the dielectric heating device 100 in the second embodiment, portions that are not specifically explained are the same as in the first embodiment.

The second conductor 32*b* has a flat plate shape along the X and Z directions. Therefore, as viewed along the X direction, the second conductor 32*b* has a so-called "I-shape" shape that extends in a straight line along the Z direction. More specifically, the shape of the second conductor 32*b* in this embodiment corresponds to a shape in which the width Wm of the intermediate portions 35 of the first conductor 31 is the same as the width W1 of the first end portion 33 and the width W2 of the second end portion 34.

Figure 13:
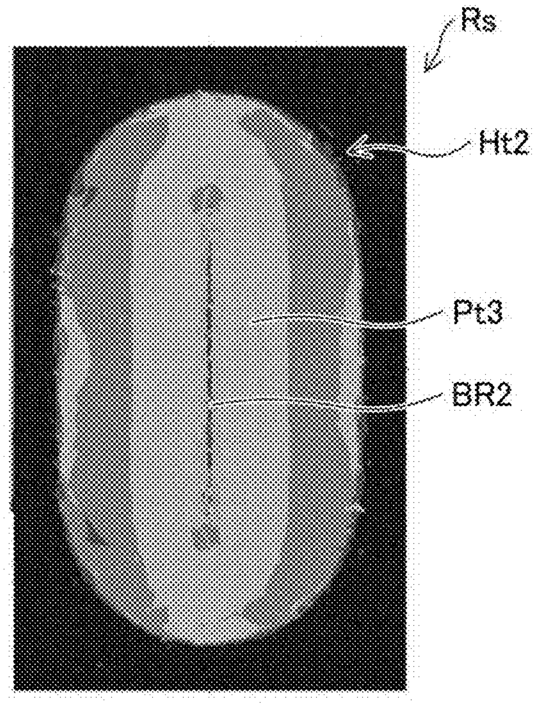
FIG. 13 is a first explanatory view showing distribution of heating energy in the second embodiment.

FIG. 13 is a first explanatory view showing distribution of heating energy in the second embodiment. FIG. 13 shows a simulation result of the heating of the medium Md by the electrode unit 20*b*, using electromagnetic field simulation. The conditions for the simulation in FIG. 13 are the same as for the simulation in FIG. 9 described in the first embodiment, except that the electrode unit 20*b* is used. The presentation of the simulation result of FIG. 13 is also the same as in the simulation in FIG. 9.

In the simulation result in FIG. 13, a heat region Ht2 was observed within the region Rs, as in FIG. 9 and FIG. 10. The simulation result of FIG. 13 shows that the power consumption density in the majority of the heat region Ht2 was at the forth level. For example, the point Pt3 shown in FIG. 13 is a portion where the power consumption density is at the fourth level. In addition, a blank region BR2 occurred in the center of the region Rs in FIG. 13, as in FIG. 9 and FIG. 10. The area of the blank region BR2 is smaller than the area of the blank region BRp shown in FIG. 10. Therefore, it is considered that in the second embodiment, as in the first embodiment, the portion where the near-field electric field intensity is very weak has shrunk.

Figure 14:
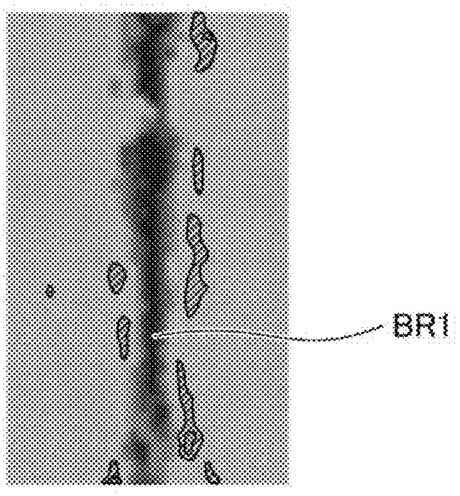
FIG. 14 is a second explanatory view showing distribution of heating energy in the first embodiment.
Figure 15:
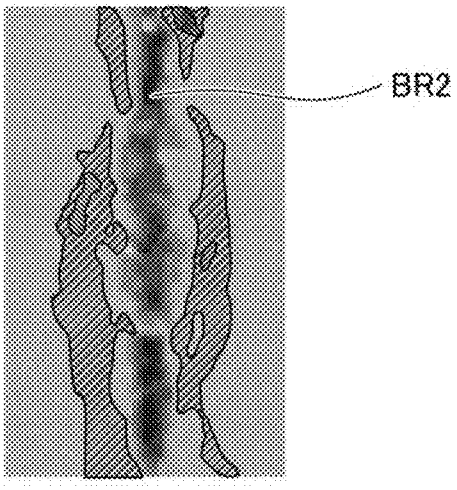
FIG. 15 is a second explanatory view showing distribution of heating energy in the second embodiment.

FIG. 14 is a second explanatory view showing distribution of heating energy in the first embodiment. FIG. 15 is a second explanatory view showing distribution of heating energy in the second embodiment. FIG. 14 is an enlarged view of an area around the blank region BR1 in the region Rs in FIG. 9. FIG. 15 is an enlarged view of an area around the blank region BR2 in the region Rs in FIG. 13. FIG. 14 and FIG. 15 show substantially the same portion of the medium Md.

In FIGS. 14 and 15, the areas where the heating energy is relatively large are hatched. More specifically, areas where the power consumption density is at the 15th to 11th levels are marked with right ascending hatching, and areas where the power consumption density is at the 6th to 10th levels are marked with right descending hatching. As shown in FIG. 14 and FIG. 15, in the second embodiment, compared to the first embodiment, the areas where the above heating energy is relatively large are widely distributed around the blank region BR2. Thus, it can be seen that in the first embodiment, the variation of the heating energy near the blank region is smaller than in the second embodiment.

In the second embodiment, for example, it is possible to compensate for the lack of the heating amount in the blank region BR2 by utilizing the fact that the areas where the heating energy is relatively large are more widely distributed around the blank region BR2.

According to the second embodiment described above, the second conductor 32*b* has a flat plate shape along the Z and X directions. Therefore, the area of the blank region can be decreased through a simpler configuration.

C. Third Embodiment

Figure 16:
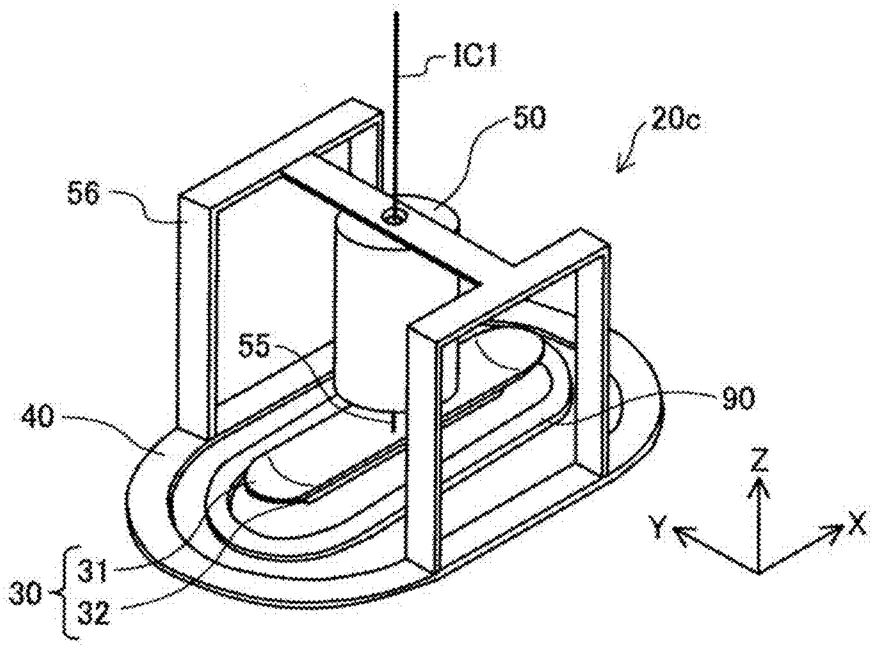
FIG. 16 is a perspective view showing a schematic configuration of an electrode unit according to a third embodiment.
Figure 17:
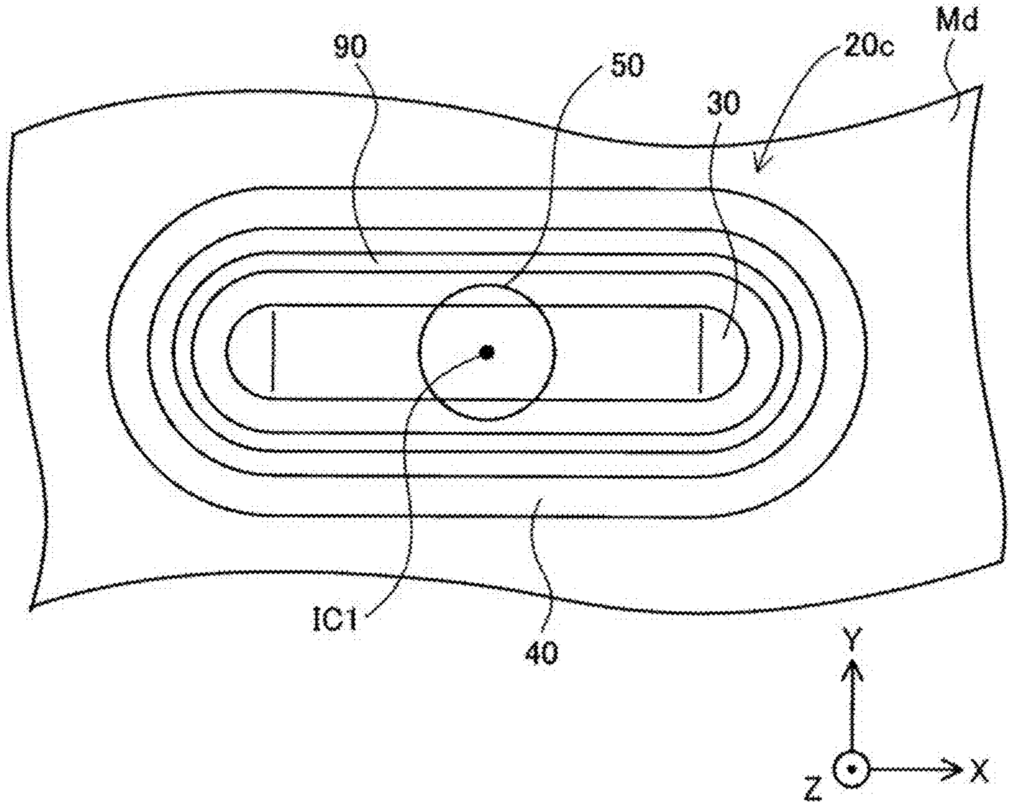
FIG. 17 is a top view of the electrode unit according to the third embodiment.

FIG. 16 is a perspective view showing a schematic configuration of the electrode unit 20*c* in the third embodiment. FIG. 17 is a top view of the electrode unit 20*c*. In FIG. 17, the connection member 56 is omitted. The electrode unit 20*c* has a third electrode 90, unlike the first embodiment, In the description of the configuration of the electrode unit 20*c* and the dielectric heating device 100 in the third embodiment, portions that are not specifically explained are the same as in the first embodiment.

The third electrode 90 is a conductor, and is located between the first electrode 30 and the second electrode 40. The third electrode 90 is not electrically connected to the power supply or the voltage applying section 80, and is electrically insulated from the first electrode 30 and the second electrode 40. For example, the third electrode 90 is supported by an insulator (not shown). The third electrode 90 may be formed of the same material as the first electrode 30 and the second electrode 40, or may be formed of a different material. The third electrode 90 is also referred to as a floating electrode.

More specifically, in this embodiment, the third electrode 90 is located so that it surrounds the first electrode 30 as viewed along the Z direction. The third electrode 90 has an oval ring shape flattened in the X and Y directions. The third electrode 90, similar to the first electrode 30 and the second electrode 40, has an elongated shape with the X direction as the longitudinal direction and the Y direction as the shorter direction as viewed along the Z direction. The second electrode 40 is located so that it surrounds the third electrode 90 and the first electrode 30, which is surrounded by the third electrode 90, as viewed along the Z-direction. Note that in other embodiments, the third electrode 90 need not be located to surround the first electrode 30 as viewed along the Z-direction, as long as the third electrode 90 is located between the first electrode 30 and the second electrode 40.

According to the third embodiment described above, the electrode unit has the third electrode 90 located between the first electrode 30 and the second electrode 40 and electrically insulated from the first electrode 30 and the second electrode 40. According to this aspect, the variation in the electric field intensity between the first electrode 30 and the second electrode 40 can be reduced more by the third electrode 90. Therefore, the possibility of heating the medium Md evenly is more likely.

D. Other Embodiments

Figure 18:
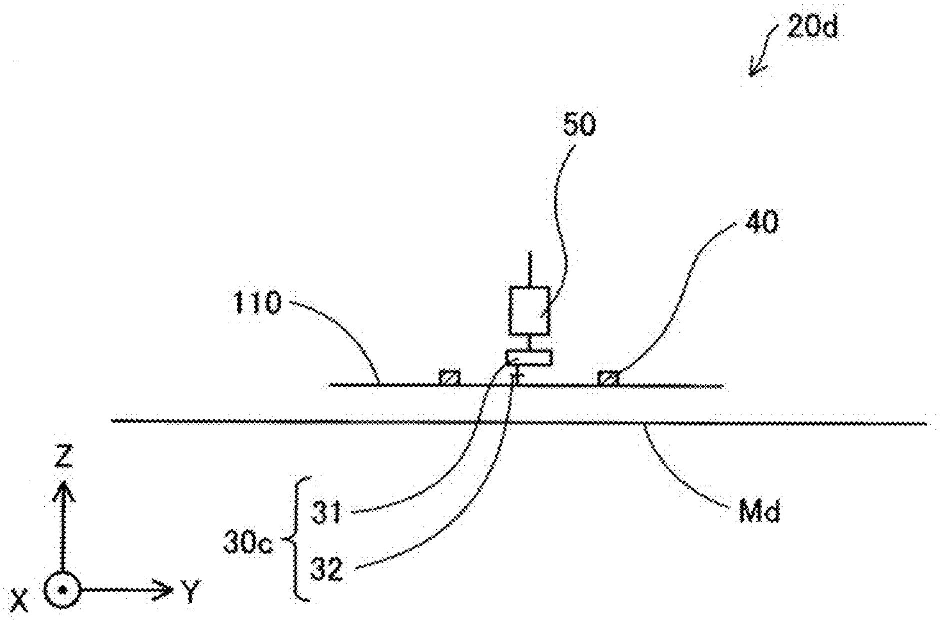
FIG. 18 is a diagram schematically showing a first example of an electrode unit according to another embodiment.

D.1. FIG. 18 is a diagram schematically showing an example of the electrode unit 20*d* in another embodiment. The second conductor 32 of the first electrode 30*c* of the electrode unit 20*d* in FIG. 18 is located such that, as viewed along the X direction, the center position of the second conductor 32 in the Y direction is located on the −Y direction side of the center position of the first conductor 31 in the Y direction. The first electrode 30 may be configured in this manner. Further, for example, the second conductor 32 may be located, as viewed along the Y direction, such that the center position of the second conductor 32 in the X direction is located on the +X direction side or on the −X direction side of the center position of the first conductor 31 in the X direction.

Figure 19:
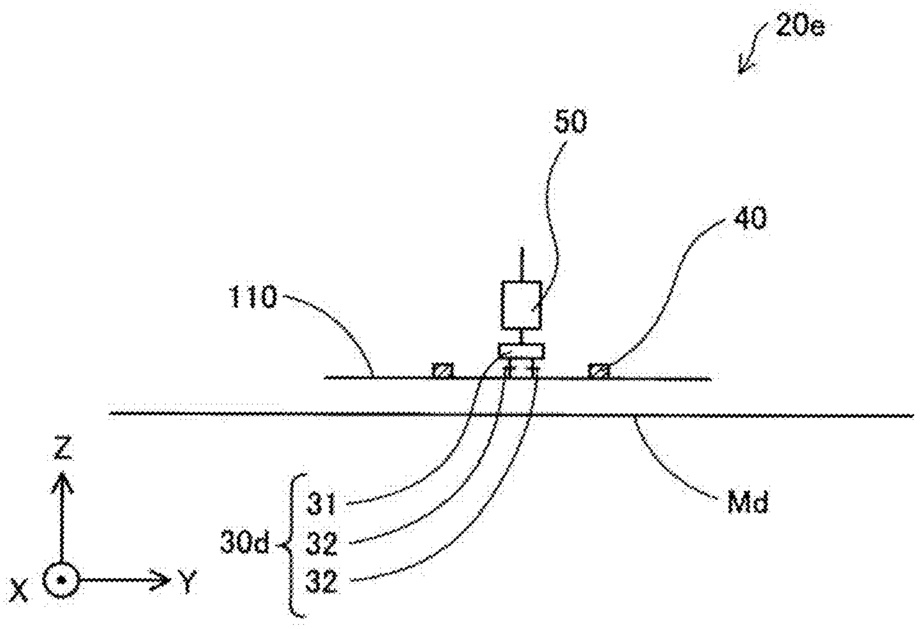
FIG. 19 is a diagram schematically showing a second example of an electrode unit according to another embodiment.

D.2. FIG. 19 is a diagram schematically showing an example of the electrode unit 20*e* of another embodiment. The first electrode 30*d* of the electrode unit 20*e* in FIG. 19 has two second conductors 32. More specifically, as viewed along the X direction, one of the second conductors 32 is located on the −Y direction side of the center position of the first conductor 31 in the Y direction, and the other of the second conductors 32 is located on the +Y direction side of the center position of the first conductor 31 in the Y direction. In this way, the first electrode 30*d* may have two second conductors 32. Further, the first electrode 30*d* may have three or more second conductors 32.

Figure 20:
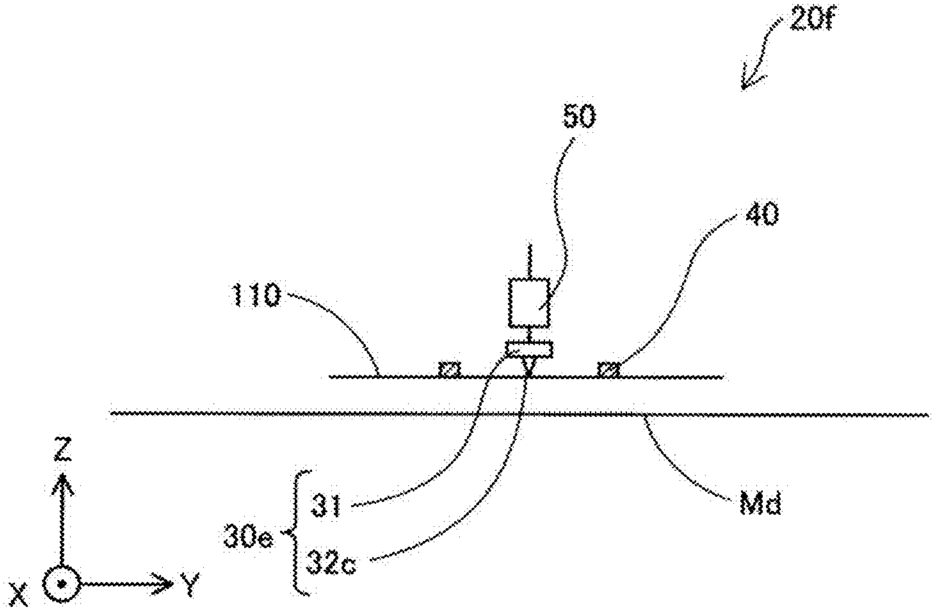
FIG. 20 is a view schematically showing a third example of an electrode unit according to another embodiment.

D.3. FIG. 20 is a diagram schematically showing an example of an electrode unit 20*f* of another embodiment. In FIG. 20, the second conductor 32*c* of the first electrode 30*e* of the electrode unit 20*f* has a so-called V-shaped shape as viewed along the X direction. In this way, the second conductor 32*c* may have a different shape than the cruciform-shaped shape or the I-shaped shape as viewed along the X direction.

D.4. In the above embodiments, the first conductor 31 has a boat shape, but it does not need to have a boat shape. For example, the first conductor 31 may have a flat plate shape, a rod shape, or a plate shape with a V-shaped cross-section. In the above embodiments, the first conductor 31 has an oval shape as viewed in the Z direction, but it does not need to have an oval shape. For example, the first conductor 31 may have a circular shape, a rectangular shape, or any other polygonal shape.

D.5. In the above embodiments, the first conductor 31 and the second conductor 32 have elongated shapes as viewed along the Z direction, with the X direction as the longitudinal direction. In contrast to this, for example, the first conductor 31 and the second conductor 32 may not have elongated shapes. In this case, for example, the first conductor 31 and the second conductor 32 may have a circular shape or a rectangular shape as viewed along the Z direction. As viewed along the Z direction, one of the first conductor 31 and the second conductor 32 may have an elongated shape and the other may not have an elongated shape. Further, for example, the first conductor 31 and the second conductor 32 may have the elongated shapes with their longitudinal directions being different from each other.

D.6. In the above embodiments, when, as in the first embodiment, the second conductor 32 is configured so that the first end portion 33 and the second end portion 34 are covered by the intermediate portion 35 when projected onto a plane perpendicular to the Z direction, the second conductor 32 need not be configured so that the second conductor 32 has a cruciform shape as viewed along the X direction. Further, the second conductor 32 need not be configured so that the first end portion 33 and the second end portion 34 are covered by the intermediate portion 35 when the second conductor 32 is projected onto the plane perpendicular to the Z direction.

D.7. In the above embodiments, the one end portion 37 of the second conductor 32 in the X direction has a shape where the distance in the Z direction between the second conductor 32 and the medium Md increases in the X direction gradually from the opposite side from the one edge portion 36 toward the one edge portion 36. In contrast, the one end portion 37 of the second conductor 32 may not have such a shape. Similarly, the other end portion 39 may not have a shape where the distance in the Z direction between the second conductor 32 and the medium Md gradually increases in the X direction from the opposite side from the other edge portion 38 toward the other edge portion 38. In this case, the second conductor 32 may be configured, for example, to have a rectangular shape or a trapezoidal shape that is convex upward as viewed along the Y direction.

D.8. In the above embodiments, the radius of curvature R of the end portions of the first conductor 31 in the longitudinal direction is larger than the radius of curvature r of the end portions of the first conductor 31 in the shorter direction. In contrast, the radius of curvature R may be smaller than or equal to the radius of curvature r.

D.9. In the above embodiments, the shortest distance in the Z direction between the first electrode 30 and the medium Md is equal to the shortest distance in the Z direction between the second electrode 40 and the medium Md. On the other hand, the shortest distance in the Z direction between the first electrode 30 and the medium Md may not be equal to the shortest distance in the Z direction between the second electrode 40 and the medium Md. In this case, for example, the lower end of the first conductor 31 of the first electrode 30 may be located above or below the lower end of the second electrode 40.

D.10. In the above embodiments, the medium Md is intermittently transported. On the other hand, the medium Md may be, for example, transported in the −Y direction at a constant speed by the first transport section 321 or the second transport section 322, without stopping in the transportation process.

D.11. In the above embodiments, the medium Md is continuously transported from the liquid ejection device 205 to the dielectric heating device 100. When the medium Md is continuously transported from the liquid ejection device 205 to the dielectric heating device 100, the transport section 320 may, for example, have only a common transport section for the dielectric heating device 100 and the liquid ejection device 205. In addition, the medium Md does not have to be continuously transported from the liquid ejection device 205 to the dielectric heating device 100. For example, after the medium Md to which the liquid is applied by the liquid ejection device 205 is once wound up in a roll shape, the medium Md may be moved to the dielectric heating device 100 by a robot or the like. In this case, the medium Md can be heated in the dielectric heating device 100, for example, while unwinding the rolled medium Md and transporting the medium Md by the second transport section 322 or the like.

D.12. In the above embodiments, the frequency of 13.56 MHz is used as the drive frequency f0. In contrast, the frequency of 13.56 MHz does not have to be used as the drive frequency f0, for example, other ISM bands such as 40.68 MHz, 2.45 GHz, 5.8 GHz, and the like, may be used. The drive frequency f0 does not have to be high frequency as long as it is a frequency that can heat the medium Md. In this case, the drive frequency f0 is desirably equal to or higher than 100 kHz and lower than 1 MHz, for example.

D.13. In the above embodiments, the dielectric heating device 100 is integrated into the liquid ejection system 200. In contrast to this, the dielectric heating device 100 does not have to be integrated into the liquid ejection system 200, and for example, only the dielectric heating device 100 may be used alone.

E. Other Aspects

The present disclosure is not limited to the embodiments described above, but can be realized in various forms without departing from the scope of the present disclosure. For example, the present disclosure can also be realized by the following aspects. The technical features in the above embodiments that correspond to the technical features in each aspect described below can be replaced or combined as appropriate to solve some or all of the issues of this disclosure or to achieve some or all of the effects of this disclosure. In addition, if the technical feature is not described as essential in this specification, it can be deleted as appropriate.

(1) According to a first aspect of the present disclosure, a dielectric heating device is provided. This dielectric heating device includes a transport section that transports a medium; an electrode unit having a first electrode and a second electrode that face the medium in a first direction and to which an AC voltage is applied, and heating the medium by a dielectric heating; and a control section that controls the transport section, wherein: the second electrode is located so as to surround the first electrode as viewed along the first direction, the first electrode has a first conductor and a second conductor that protrudes from the first conductor toward the medium, and the second conductor is covered by the first conductor when projected onto a plane perpendicular to the first direction. According to this aspect, it is possible to suppress the occurrence of portions where the AC electric field intensity is very weak locally within the region of the medium that overlaps with the first electrode, by the second conductor. Therefore, the possibility of heating the medium evenly is increased.

(2) In the above aspect, as viewed along the first direction, the first conductor and the second conductor may have an elongated shape having a longitudinal direction along a second direction that is orthogonal to the first direction and having a shorter direction along a third direction that is orthogonal to the first direction and the second direction. According to this aspect, in an aspect where the first conductor has an elongated shape, the second conductor, which has an elongated shape similar to the first conductor, enables effectively suppressing the occurrence of portions where the AC electric field intensity is very weak locally.

(3) In the above aspects, the second conductor may have, in the first direction, the first end portion that is connected to the first conductor, the second end portion that is on the opposite side from the first end portion, and an intermediate portion that is located between the first end portion and the second end portion and that has the width, in the third direction, greater than the widths of the first end portion and the second end portion. According to this aspect, it is possible to further suppress the variation of electric field intensity in the medium. Thus, the possibility of heating the medium evenly is more likely to be achieved.

(4) In the above aspects, when the second conductor is projected onto a plane perpendicular to the first direction, the first end portion and the second end portion are covered by the intermediate portion. According to this aspect, the variation of the electric field intensity can be further suppressed.

(5) In the above aspects, the second conductor may have a cruciform shape as viewed along the second direction. According to this aspect, it is possible to suppress the occurrence of portions where the AC electric field intensity is locally very weak and also to suppress the variation of the electric field intensity, through a simple configuration.

(6) In the above aspects, the second conductor may have a flat plate shape along the first and second directions. According to this aspect, it is possible to suppress the occurrence of portions where the AC electric field intensity is locally very weak, through a simpler configuration.

(7) In the above aspects, one end portion of the second conductor, including one edge portion in the second direction, may have a shape where the distance in the first direction between the second conductor and the medium gradually increases in the second direction from the opposite side from the one edge portion toward the one edge portion. According to this aspect, the concentration of the electric field at one edge portion of the second conductor in the second direction can be suppressed.

(8) In the above aspects, the radius of curvature at end portions of the first conductor in the second direction may be larger than the radius of curvature at end portions of the first conductor in the third direction. According to this aspect, the concentration of electric field at the end portions in the longitudinal direction of the first conductor can be suppressed.

(9) In the above aspects, the shortest distance between the first electrode and the medium in the first direction may be equal to the shortest distance between the second electrode and the medium in the first direction. According to this aspect, the possibility of heating the medium evenly is more likely to be achieved.

(10) In the above aspects, the dielectric heating device may have the third electrode that is located between the first electrode and the second electrode and that is electrically insulated from the first electrode and the second electrode. According to this aspect, the variation in the electric field intensity between the first electrode and the second electrode can be decreased more by the third electrode. Thus, the possibility of heating the medium evenly is more likely to be achieved.

(11) According to a second aspect of this disclosure, a liquid ejection system is provided. This liquid ejection system includes the dielectric heating device in the above aspects and a liquid ejection section that applies liquid to the medium.

(12) According to a third aspect of this disclosure, an electrode unit has a first electrode and a second electrode facing medium in a first direction and to which an AC voltage is applied, the second electrode is located so as to surround the first electrode as viewed along the first direction, the first electrode has a first conductor and a second conductor that protrudes from the first conductor toward the medium, and the second conductor is covered with the first conductor when projected onto a plane perpendicular to the first direction, a liquid ejection device for ejecting liquid heated by the electrode unit to be applied onto the medium is provided. This liquid ejection device includes a transport section that transports the medium, a liquid ejection section that applies liquid to the medium, and an ejection control section that controls the transport section and the liquid ejection section.

What is claimed is:

1. A dielectric heating device comprising:

a transport section that transports a medium;

an electrode unit having a first electrode and a second electrode that face the medium in a first direction and to which an AC voltage is applied, and heating the medium by a dielectric heating; and a control section that controls the transport section, wherein:

the second electrode is located so as to surround the first electrode as viewed along the first direction, the first electrode has a first conductor and a second conductor that protrudes from the first conductor toward the medium, and the second conductor is covered by the first conductor when projected onto a plane perpendicular to the first direction.

2. The dielectric heating device according to claim 1, wherein:

as viewed along the first direction, the first conductor and the second conductor have an elongated shape having a longitudinal direction along a second direction that is orthogonal to the first direction and having a shorter direction along a third direction that is orthogonal to the first direction and the second direction.

3. The dielectric heating device according to claim 2, wherein:

the second conductor has, in the first direction, a first end portion that is connected to the first conductor, a second end portion that is on the opposite side from the first end portion, and an intermediate portion that is located between the first end portion and the second end portion and that has a width, in the third direction, greater than widths of the first end portion and the second end portion.

4. The dielectric heating device according to claim 3, wherein:

when the second conductor is projected onto a plane perpendicular to the first direction, the first end portion and the second end portion are covered by the intermediate portion.

5. The dielectric heating device according to claim 4, wherein:

the second conductor has a cruciform shape as viewed along the second direction.

6. The dielectric heating device according to claim 2, wherein:

the second conductor has a flat plate shape along the first direction and the second direction.

7. The dielectric heating device according to claim 2, wherein:

one end portion of the second conductor, including one edge portion in the second direction, has a shape where the distance in the first direction between the second conductor and the medium gradually increases from the opposite side from the one edge portion toward the one edge portion, in the second direction.

8. The dielectric heating device according to claim 2, wherein:

a radius of curvature at end portions of the first conductor in the second direction is larger than a radius of curvature at end portions of the first conductor in the third direction.

9. The dielectric heating device according to claim 1, wherein:

a shortest distance between the first electrode and the medium in the first direction is equal to a shortest distance between the second electrode and the medium in the first direction.

10. The dielectric heating device according to claim 1, further comprising:

a third electrode that is located between the first electrode and the second electrode and that is electrically insulated from the first electrode and the second electrode.

11. A liquid ejection system comprising:

the dielectric heating device according to claim 1, and a liquid ejection section that applies liquid to the medium.

* * * * *